Jan. 17, 1956     E. M. LIPPERT ET AL     2,731,206
CALCULATING MACHINE FUNCTION CONTROL KEYS INTERLOCK
Filed Sept. 20, 1951     8 Sheets-Sheet 1
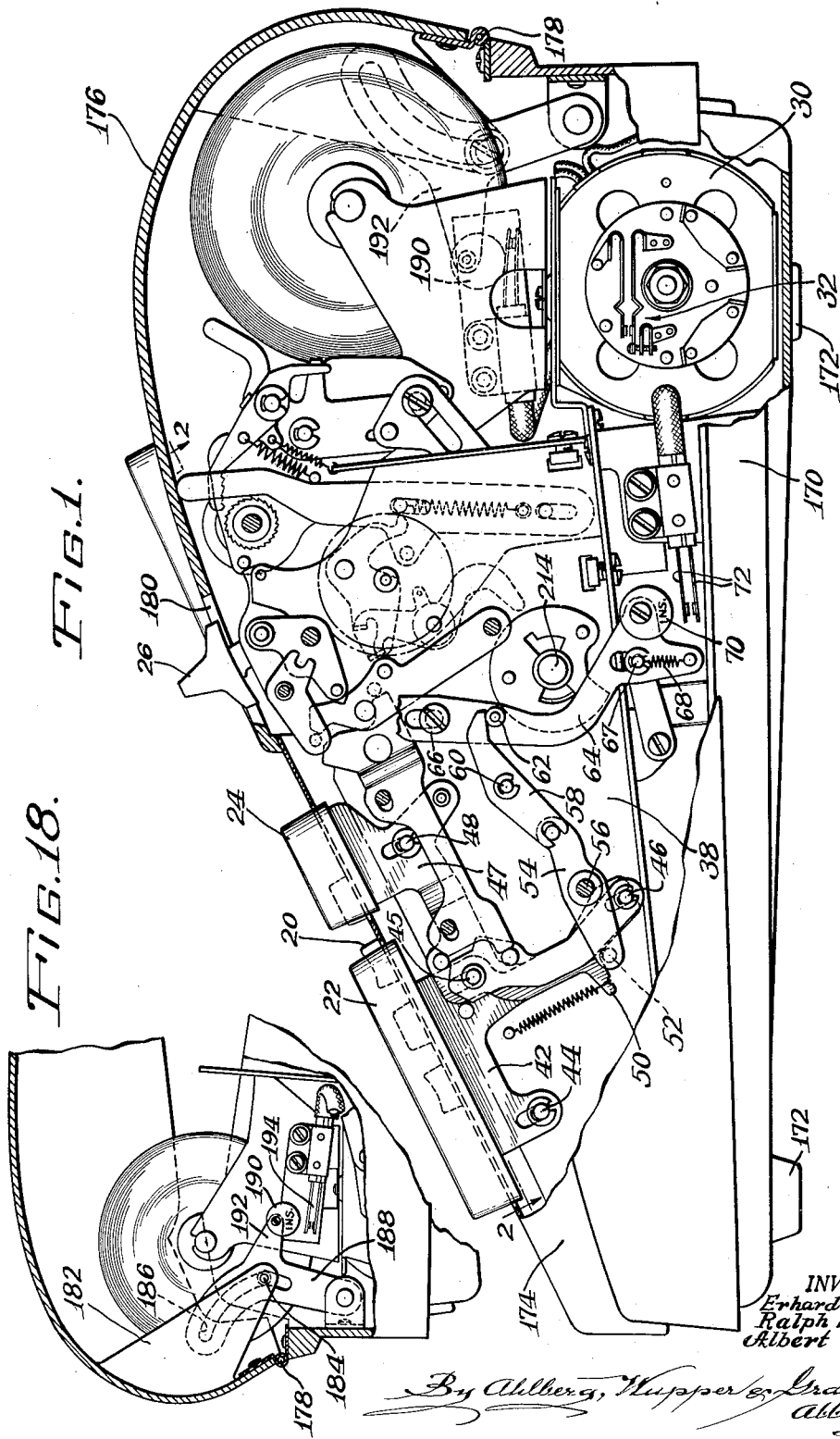
INVENTORS:
Erhard M. Lippert
Ralph L. Schultz
Albert V. Neyfeldt
By Ahlberg, Hupper & Gradolph
Attorneys.

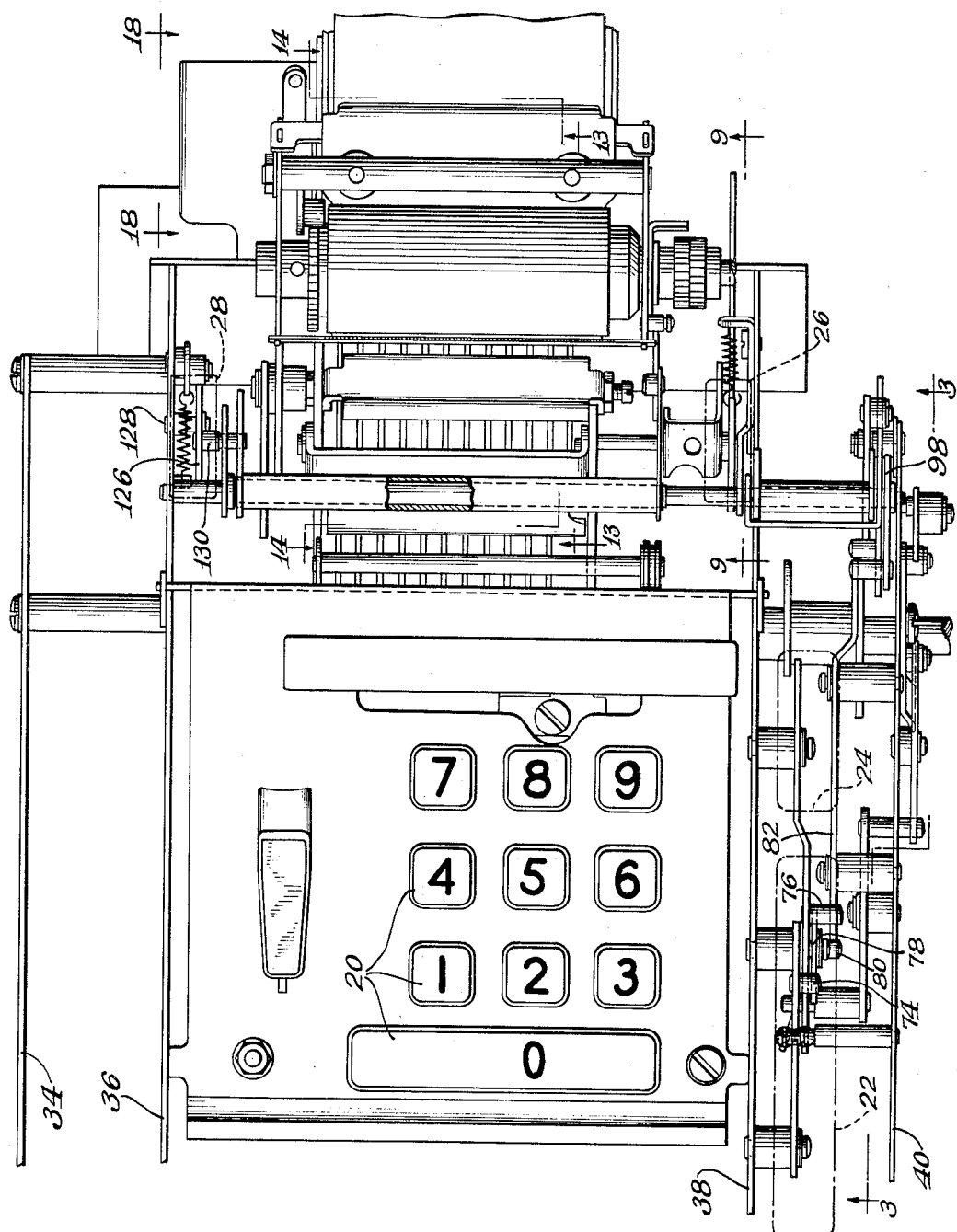

Jan. 17, 1956  E. M. LIPPERT ET AL  2,731,206
CALCULATING MACHINE FUNCTION CONTROL KEYS INTERLOCK
Filed Sept. 20, 1951  8 Sheets-Sheet 3
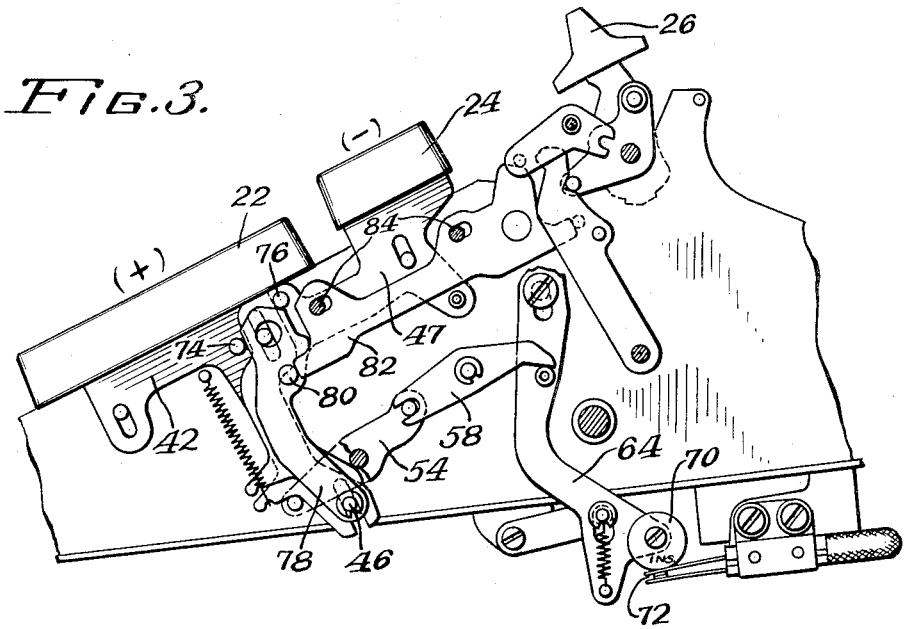
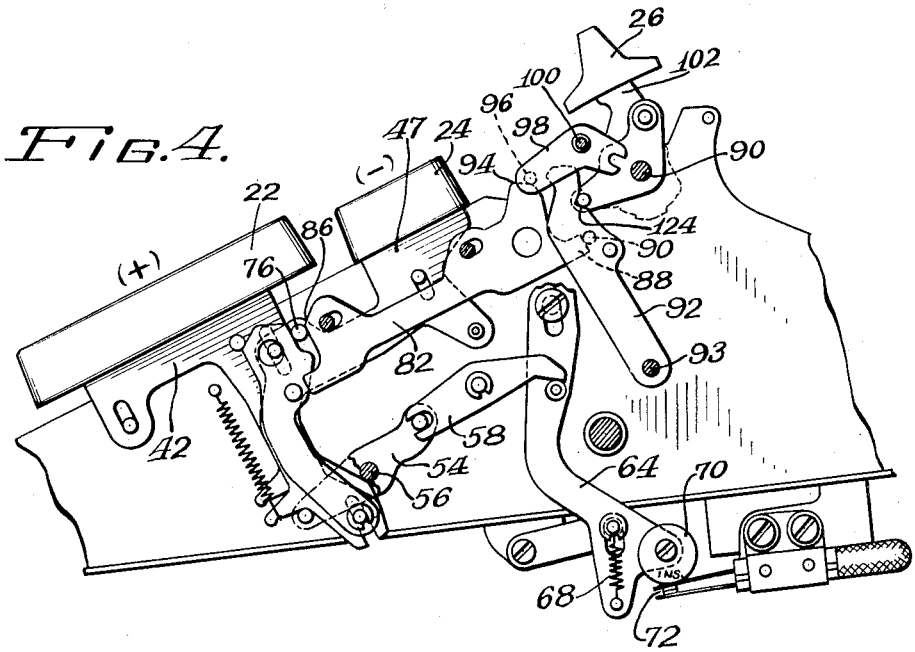
INVENTORS:
Erhard M. Lippert
Ralph L. Schultz
Albert V. Neyfeldt
By Ahlberg, Wupper & Gradolph
Attorneys.

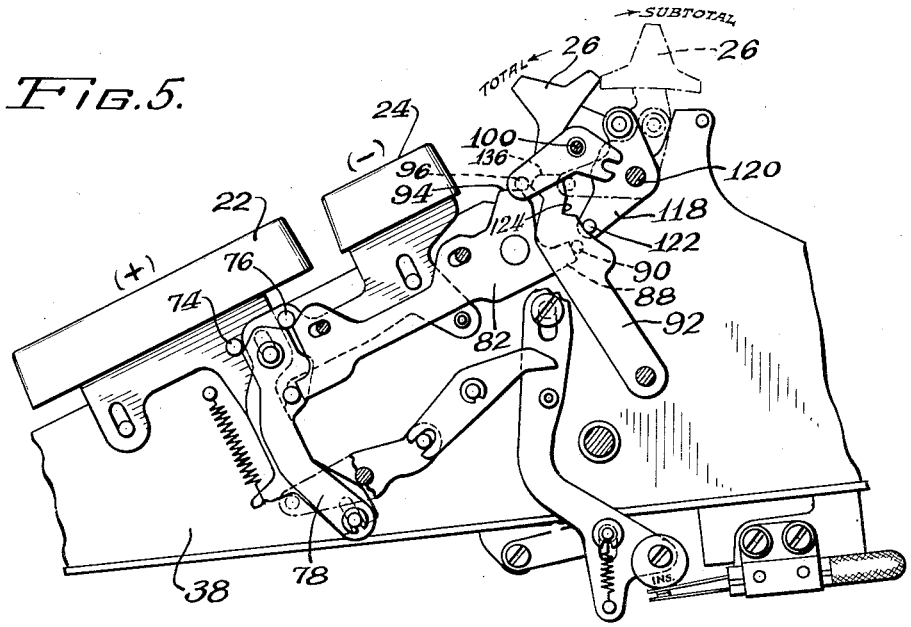
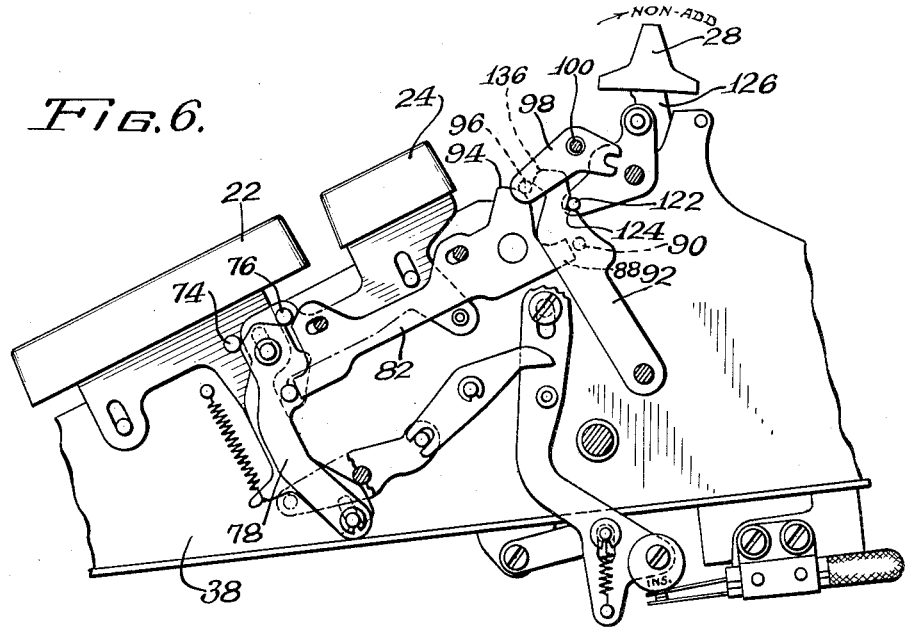

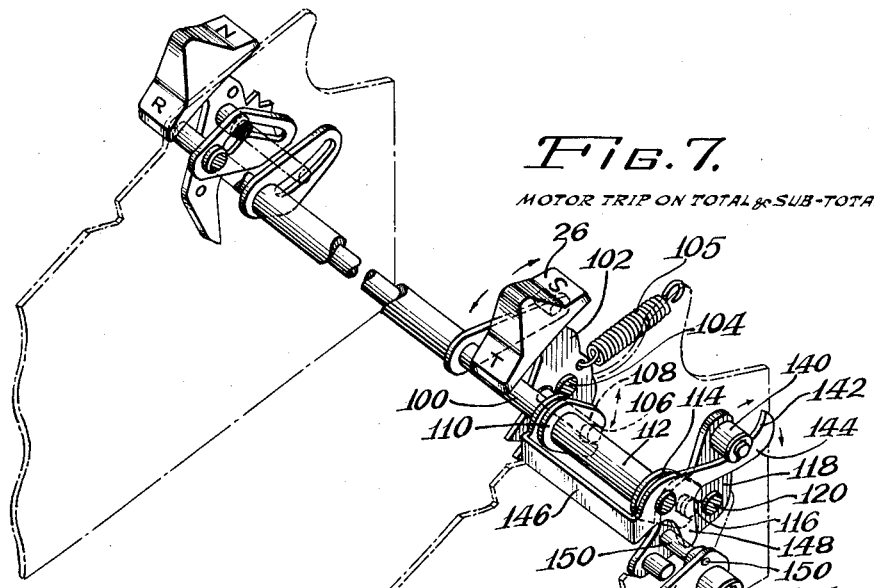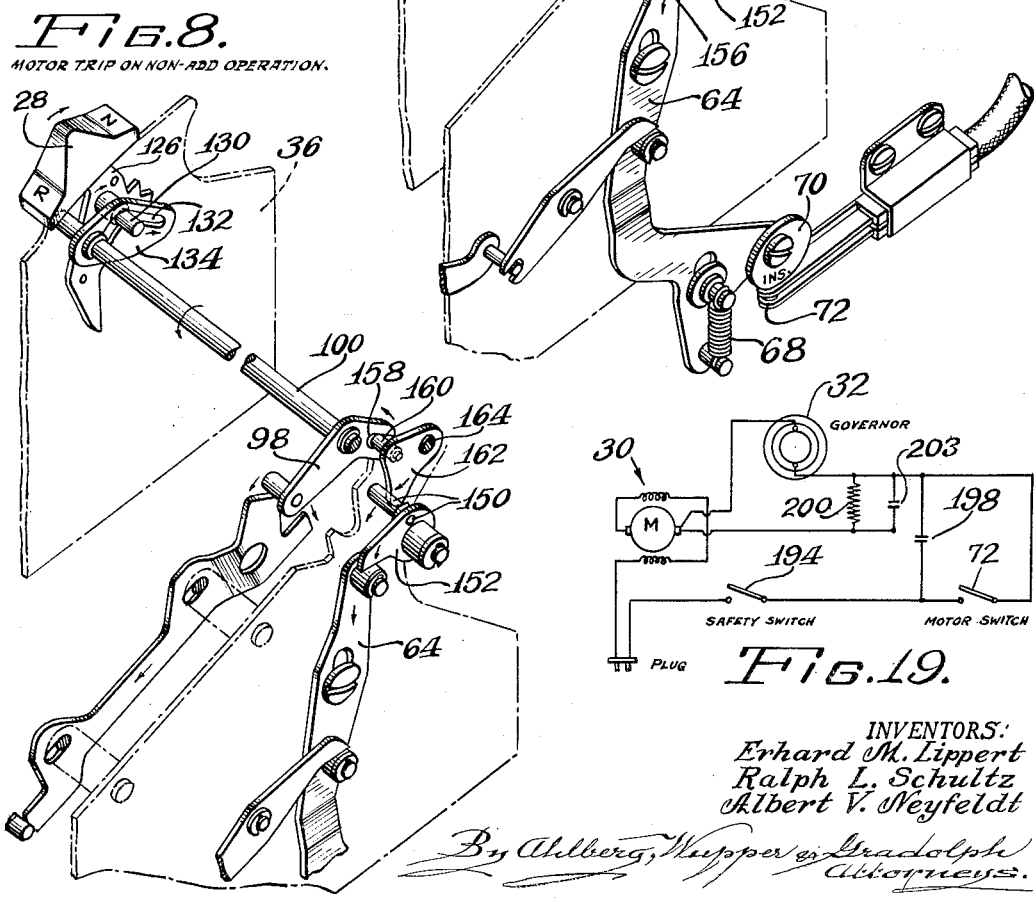

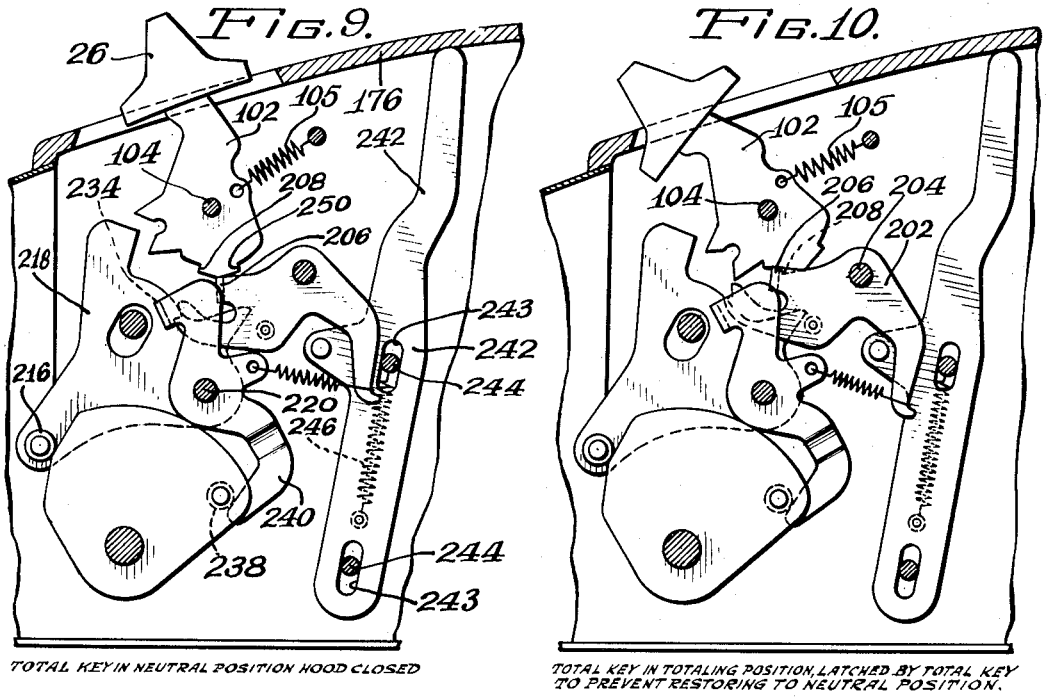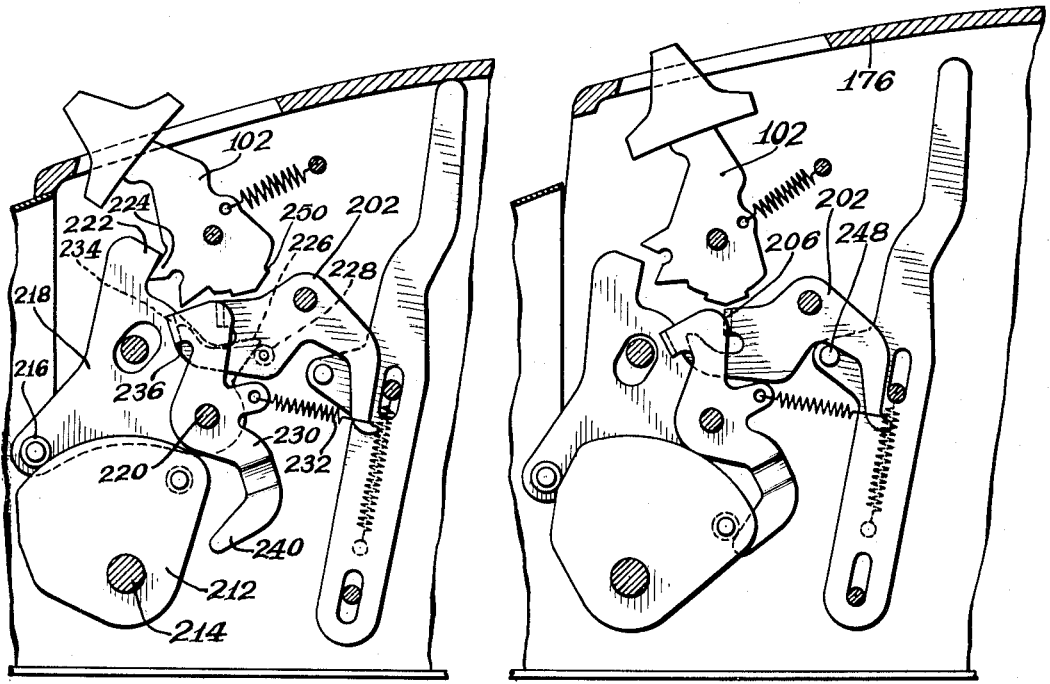

Jan. 17, 1956     E. M. LIPPERT ET AL     2,731,206
CALCULATING MACHINE FUNCTION CONTROL KEYS INTERLOCK
Filed Sept. 20, 1951     8 Sheets-Sheet 7
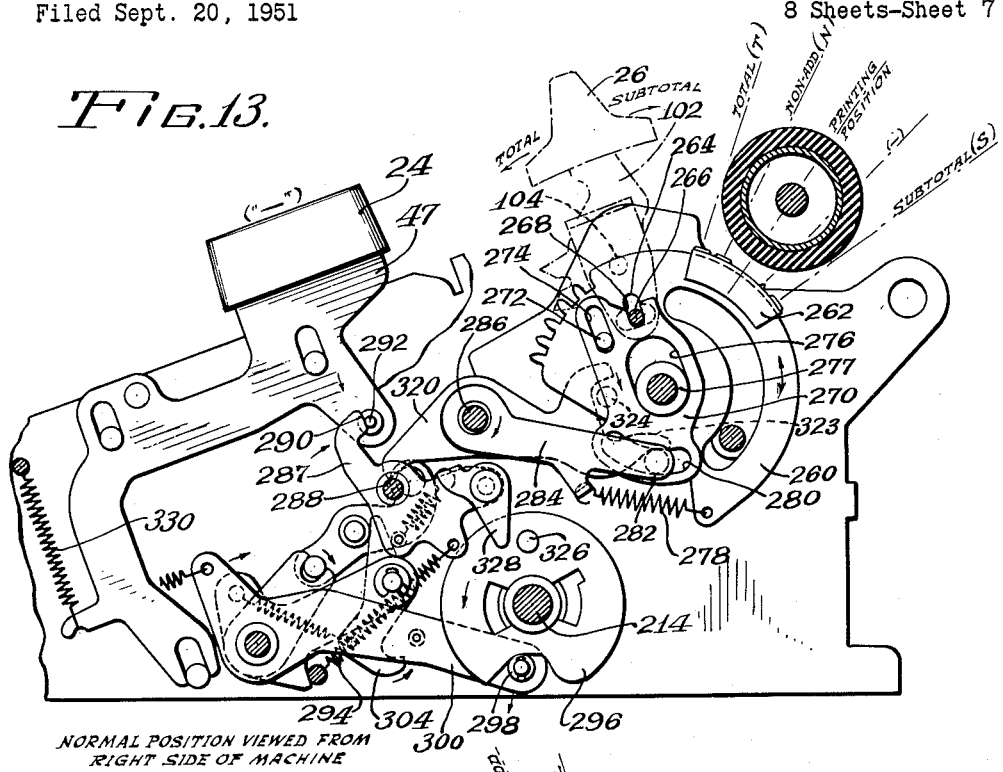
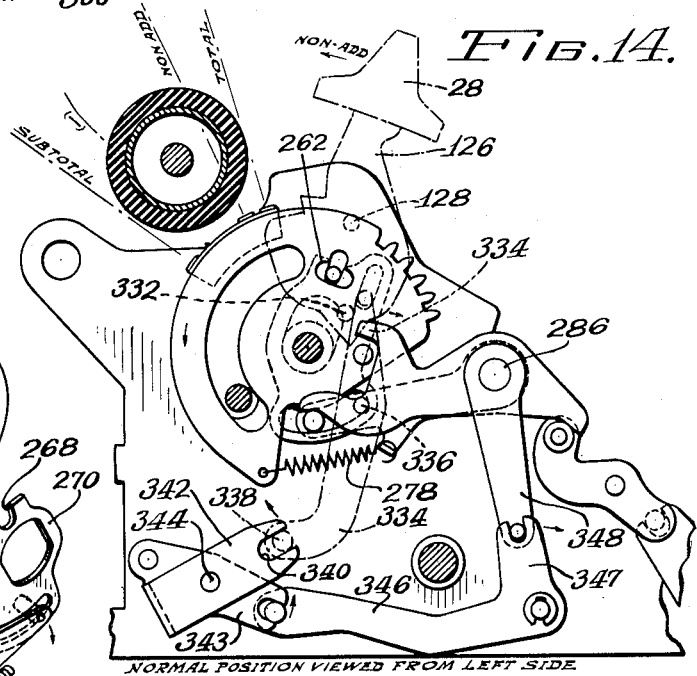
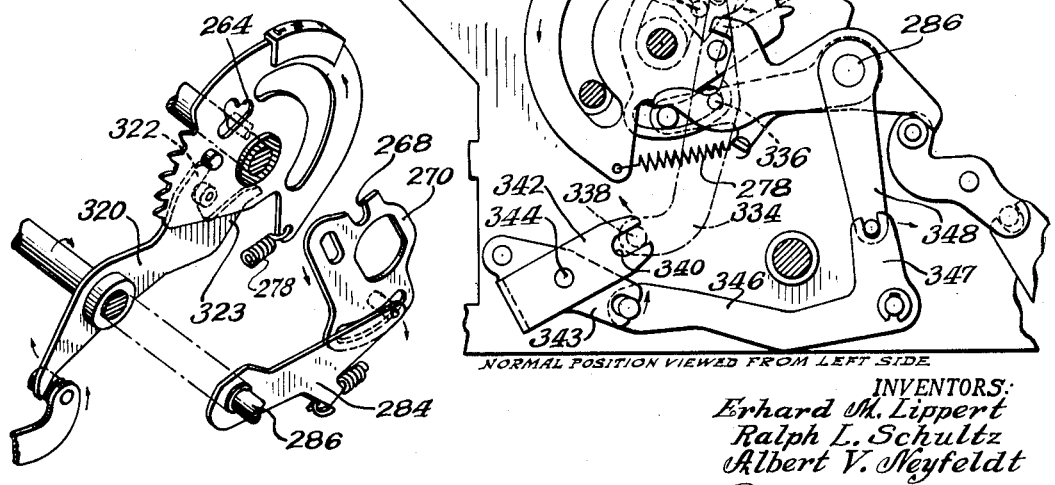
INVENTORS:
Erhard M. Lippert
Ralph L. Schultz
Albert V. Neyfeldt
By Ahlberg, Wupper & Gradolph
Attorneys.

SIGNAL SECTOR IN "−" SIGN PRINTING POSITION

SIGNAL SECTOR IN "NON ADD" PRINTING POSITION

INVENTORS:
Erhard M. Lippert
Ralph L. Schultz
Albert V. Neyfeldt
By Ahlberg, Wupper & Gradolph
Attorneys.

United States Patent Office 2,731,206
Patented Jan. 17, 1956

2,731,206

CALCULATING MACHINE FUNCTION CONTROL KEYS INTERLOCK

Erhard M. Lippert, Ralph L. Schultz, and Albert V. Neyfeldt, Chicago, Ill., assignors to Victor Adding Machine Co., Chicago, Ill., a corporation of Illinois Application September 20, 1951, Serial No. 247,491

9 Claims. (Cl. 235—130)

Our invention relates generally to calculating machines, and more particularly to improved control and operation registering mechanism.

It is a general object of the invention to provide an improved calculating machine which is easy to operate, in which misoperation of the controls is prevented, and in which the character of the operation is registered on the tape by a simple and improved mechanism.

A further object is to provide an improved calculating machine in which improved controls are utilized to enable the operator to use the machine more efficiently and effectively, and in which the misoperation of the machine is prevented while the paper roll is being replaced or the ribbon is being changed.

Other objects will become apparent from the following description, reference being had to the accompanying drawings, in which—

Fig. 1 is a right side elevational view of the machine, with a portion of the casing removed;

Fig. 2 is a plan view of the machine, taken generally on the line 2—2 of Fig. 1;

Fig. 3 is a fragmentary vertical sectional view, taken on the line 3—3 of Fig. 2, showing the plus and minus key interlocks and the mechanism through which the motor switch is operated by the plus key;

Fig. 4 is a view similar to Fig. 3, with the minus key depressed;

Fig. 5 is a view similar to Fig. 3, showing the parts in total taking position;

Fig. 6 is a view similar to Fig. 3, showing the parts in non-add position;

Fig. 7 is a perspective view of the mechanism for operating the motor switch during total and subtotal operations;

Fig. 8 is a fragmentary perspective view, showing the manner in which the motor switch operating mechanism is controlled during a non-add operation;

Figs. 9 to 12 are fragmentary vertical sectional views, taken on the line 9—9 of Fig. 2, showing the mechanism for latching the total key in partly operated position, for moving it to fully operated position, and for preventing the total key from being latched when the hood of the casing is raised;

Fig. 13 is a fragmentary sectional view, taken on the line 13—13 of Fig. 2, showing the manner in which the operation indicating signal printing segment is operated;

Fig. 14 is a fragmentary vertical sectional view, taken on the line 14—14 of Fig. 2, taken from the left-hand side of the machine, showing the manner in which the non-add key operates the signal printing segment;

Fig. 15 is a fragmentary perspective view of a portion of the means for positioning the signal printing segment;

Fig. 18 is a fragmentary sectional view, taken on the line 18—18 of Fig. 2, taken from the left side of the machine, showing the hood operated safety switch; and Fig. 19 is a schematic wiring diagram of the electrical circuit employed to energize the motor.

Figure 16:
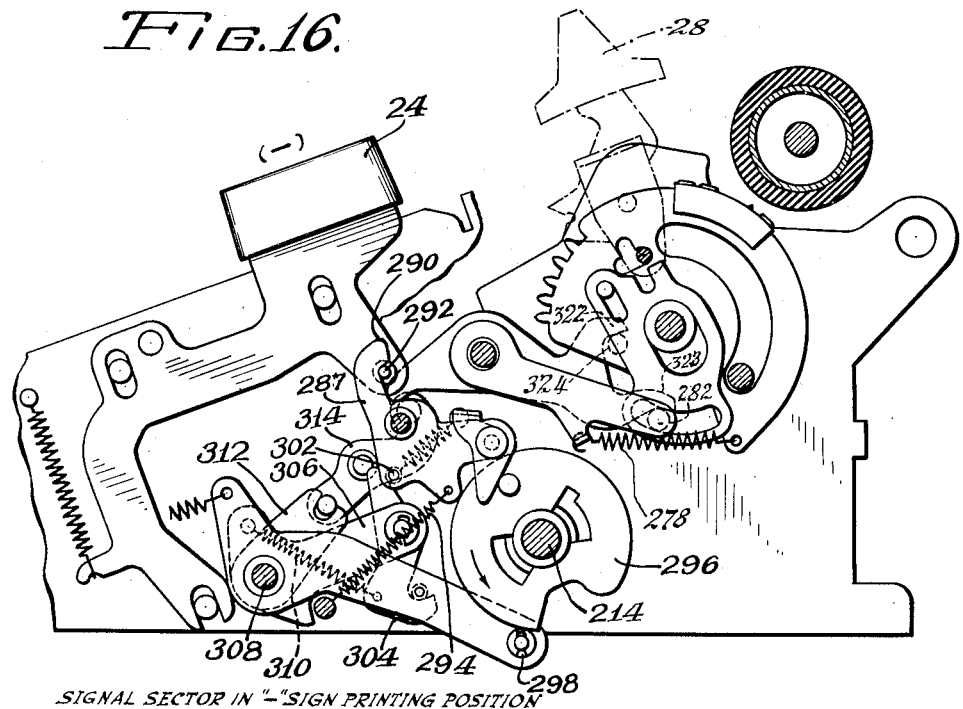
Fig. 16 is a vertical sectional view showing the means by which the signal printing segment is positioned by the minus bar.

Referring to Figs. 1 and 2, the machine comprises the usual numeral keys 20, a plus bar 22, a minus bar 24, a total and subtotal key 26, and a non-add and repeat key 28.

The machine illustrated is operated by an electric motor 30 having a suitable speed governing mechanism 32.

Generally speaking, the machine comprises an outer left side frame plate 34, an inner left side frame plate 36, an inner right side frame plate 38, and an outer right side frame plate 40. The plus bar 22 is secured to a key stem 42 which is guided for generally vertical movement by three studs 44, 45, and 46, carried by the frame plate 38, the stem having suitable elongated slots for the reception of these studs. Similarly, the minus key stem 47 is guided on studs 45, 46, and 48. Each of the key stems 42 and 47 has a forwardly projecting lug 50 which overlies a stud 52 projecting sidewardly from a rocker lever 54 pivoted on a stud 56 carried by the outer right frame plate 40. The other end of the rocking lever 54 has a pin and open end slot connection with an intermediate lever 58 pivoted on a stud 60, and the rearward end of the lever 58 overlies a roller 62 mounted on a switch operating link 64, the latter being vertically slidable on a pair of studs 66, 67, the link being normally held in its uppermost position by a tension spring 68. The link 64 has an eccentrically mounted insulating disc 70 for engagement with the leaf spring switch 72 which, as will appear hereinafter, is in the motor energizing circuit.

As best shown in Figs. 3 and 4, a locking arm 78 is pivoted on stud 46, the plus key stem 42 has a sidewardly projecting stud 74, while the minus key stem 47 has a similar sidewardly projecting stud 76. These studs are positioned so as to move locking arm 78 rearwardly when the plus key 22 is depressed, and forwardly when the minus key 24 is depressed, the locking arm 78 thus preventing the plus and minus keys from being depressed at the same time. It will be noted, particularly from Figs. 3 and 4, that the depending portions of the key stems 42 and 47 are similarly shaped and operate the lever 54, and hence the motor switch 72, in the same manner. The locking arm 78 carries a stud 80 which, when the arm is swung rearwardly, as by depression of the plus key, moves a slide 82 rearwardly, the slide being mounted for limited reciprocation on a pair of studs 84.

When the minus key 24 is depressed, as shown in Fig. 4, the stud 76 on its key stem engages a camming surface 86 on the slide 82 and cams the latter rearwardly.

The rearward end of the slide 82 has a projection 88 which is in engagement with a stud 90 projecting sidewardly from a lever 92 pivoted at 93. The slide 82 also has an upwardly and rearwardly facing camming projection 94 which normally contacts a sidewardly projecting stud 96 on a crank 98 pivoted on a shaft 100.

As will appear hereinafter, the arm 92 and crank 98 serve as means for locking the total and subtotal key and the non-add key, respectively.

The total and subtotal key 26 is mounted on a key stem 102 (Fig. 7), the latter being pivoted on a stud 104 and biased to its normal central position by a tension spring 105. The key stem has a sidewardly projecting stud 106 which is slidable in an open end slot 108 formed in an arm 110 which is secured to a sleeve 112. The right-hand end of the sleeve 112 has an arm 114 secured thereto which is similar in shape to the arm 110. The open end slot in the arm 114 embraces a stud 116 projecting sidewardly from a crank 118 which is pivoted on a stud 120 lying on the same center as the stud 104 upon which the total key stem 102 is pivoted. The crank 118 carries a stud 122 (Fig. 5) which is normally in alignment with a notch 124 in the arm 92. However, when the key 26 is swung forwardly, as when conditioning the machine for a total taking operation, or rearwardly, as when taking a subtotal (as shown in dotted lines in Fig. 5), the pin 122 cams the arm 92 forwardly, thereby through the stud 90 and projection 88 of the slide 82, moving the slide forwardly, thereby swinging the locking lever 78 forwardly, the slide and locking lever thus preventing the depression of either the plus or minus key bar by virtue of the fact that they are positioned beneath the studs 74 and 76.

The non-add key 28 is secured to a stem 126 which, as best shown in Fig. 2, is pivoted on a stud 128 and has a shouldered stud 130 secured thereto. This stud, as best shown in Fig. 8, projects through an elbow-shaped slot 132 formed in an arm 134 secured to a shaft 100. The shaft 100 extends transversely across the machine and, as shown in Fig. 6, has the arm 98 secured thereto, this arm carrying the stud 96 which, as previously described, engages a camming projection 94 on the slide 82. When the non-add key is swung rearwardly, it cams the arm 134 upwardly, rotating the shaft 100 counterclockwise (Figs. 6 and 8) and by virtue of the camming action of the stud 96 against the surface 94, the slide 82 is pushed forwardly, thus preventing operation of either the plus or minus key bars 22, 24. The stud 96 also engages the upper end 136 of the arm 92 and cams the latter rearwardly to cause the notch 124 to engage the stud 122 and thereby lock the total and subtotal key against operation. It will be noted, for example in Fig. 6, that the upper end of the locking arm 78 and the camming surface 86 lie under the stud 76 on the minus key stem 47, and that the upper end of the locking lever 78 also lies beneath the stud 74.

Thus it will be clear that the total and subtotal key 26, the non-add key 28, the plus bar 22, and the minus bar 24, are each interlocked with the others so that operation of any one of these keys will prevent the operation of the remaining keys.

It will be recalled that depression of either the plus bar 26 or the minus bar 24 will cause depression of the link 64 and closure of the switch 72. The operation of the total and subtotal key and the non-add key are also effective to close the switch 72. The total and subtotal key 26 operates the switch through the mechanism in part previously described, namely, the arm 108, sleeve 112, arm 114, and crank 118. The crank 118 carries a roller 140 (Fig. 7) which rides along the curved edge 142 of a lever 144, the latter being pivoted on shaft 100 and having a bail portion 146 to steady it. The lever 144 has a downwardly extending projection 148 which, when the lever swings clockwise (Fig. 7) engages a stud 150 which extends inwardly from an arm 152 mounted on a stud 154. The arm 152 overlies a roller 156 mounted on the upper end of the link 64. The camming surface 142 is of such contour that the lever 144 will be swung clockwise irrespective of whether the key 26 is pushed rearwardly to initiate a subtotal, or forwardly to initiate a total taking operation.

It will be apparent from Fig. 8 that the operation of the non-add key 28 will cause counterclockwise movement of the shaft 100 and lever 98. The lever 98 has an open end slot 158 for the reception of a stud 160 carried on an arm 162 and pivoted on a stud 164. The forward edge of the lever 162 has camming engagement with stud 150 and thus rotates the arm 152 counterclockwise to depress the motor switch operating link 64.

Referring to Fig. 1, the casing of the machine includes a base 170 which has the usual rubber feet 172. A front casing part 174 is mounted on the base 170 and a hood portion 176 of the casing is secured to the base 170 by a hinge 178, this hood being provided with suitable openings 180 for the keys 26 and 28. As best shown in Fig. 18, the hood 176 has a downwardly and forwardly projecting arm 182 carrying a stud 184 which rides in a slot 186 formed in a three-armed crank 188. The major portion of the slot 186 is circular about the center of the pintle of hinge 178. The lower end of the slot is so shaped that upon initial upward swinging movement of the hood 176 the crank 188 is swung counterclockwise, as shown in Fig. 18. The forwardly extending arm 192 of the three-armed crank 188 has a disc 190 of insulating material secured thereto for the operation of a leaf spring switch 194. When the hood is in its normal lowered position, the disc 190 holds the switch 194 closed, as shown in dotted lines in Fig. 1.

As shown in Fig. 19, the motor 30 is wired in series with speed governor 32, motor switch 72, and the safety switch 194. An antispark capacitor 198 is connected across switch 72 and a resistor 200 and capacitor 203 are connected across the governor to reduce sparking at the contact points thereof. Thus when the hood is lifted and the switch 194 is opened, it will be seen from the circuit diagram of Fig. 19 that the motor cannot be started by operation of any of the keys.

In prior machines of this type, the operator might strike the total key 26 a glancing blow to flip it to total taking position. In such instances the switch 72 might be closed to start the motor, but the key might have returned to normal position before being locked in its operating position through operation of the machine. Such rapid operation of the key would therefore result in merely a blank stroke. In the machine disclosed herein, such misoperation of the machine is prevented by providing a latch 202 (Figs. 9–12) pivoted on a stud 204 and having a sidewardly bent lug 206 for engagement with a tooth 208 forming part of key stem 102. When the key 26 is flipped forwardly to the position shown in Fig. 10, or slightly beyond, the lug 206 engages behind the tooth 208 and prevents the key stem 102 from being returned to normal position by its return spring 105. In flipping the key 26 forwardly slightly beyond the position in which it is shown in Fig. 10, the switch 72 is closed and it is latched in closed position by suitable means such, for example, as shown in T. O. Mehan Patent No. 2,362,709.

As the motor commences to rotate, a cam 212 on the main rock shaft 214 engages a roller 216 carried by a lock plate 218 pivoted on a stud 220, and swings the lock plate 218 clockwise to the position in which it is shown in Fig. 11. In moving to this position, it will be noted that an ear 222 forming part of the lock plate 218, engages a projection 224 on the key stem 102 and swings the latter counterclockwise to its fully operated position. At the same time a projection 226 on the lock plate 218 engages a stud 228 on the latch lever 202 and swings the latter counterclockwise to a position such that a keeper lever 230 may be swung clockwise by a spring 232 and thereby cause a sidewardly bent lug 234 to engage in a notch 236 formed in the forward end of the latching lever 202. Near the end of the return stroke of the rock shaft 214, the roller 216 follows the cam surface and the locking plate is moved to the position shown in Fig. 9, and thus releases the key stem 102 to permit the latter to return to its normal central position. At the very end of the return stroke, a roller 238 engages a depending hook portion 240 of the lever 230 and swings the latter slightly counterclockwise to free the lug 234 thereof from the notch 236 at the forward end of the latch lever 202, whereupon all of the parts will be restored to the position in which they are shown in Fig. 9.

If, with the hood 176 raised, the operator were to operate the key 26 as by swinging it forwardly for a total taking operation, the machine would not start operating because the safety switch 194 would be open. However, the key might remain latched and thus prevent the hood from being lowered to its normal position, or damage the key. Means is therefore provided to prevent operation of the latch 202 whenever the hood is raised from its normal position. This means is best shown in Figs. 9 and 12, and comprises a slide 242 having elongated slots 243 which encompass studs 244. The slide 242 is biased for upward movement by a tension spring 246. The slide is normally held in its lower position by the engagement of the hood 176 with the upper end of the slide. However, when the hood is raised the slide 242 is free to move upwardly to the position shown in Fig. 12, and in sliding upwardly, a pin 248 carried thereby engages beneath the rearwardly projecting arm of latch lever 202 and swings the latter counterclockwise to prevent this latch lever from having its lug 206 engage the tooth 208. The total key latching mechanism is thus disabled.

When a subtotal is to be taken, the key 226 is swung clockwise from the position shown in Fig. 9, until the lug 206 on the latching lever 202 engages behind a tooth 250 formed on the key stem 102. In other respects the mechanism shown in Figs. 9 to 12 operates, in preparing for the taking of a subtotal, in the same manner as above described with reference to its operation for total taking.

It will be noted that the spring 105 is a centering spring and is effective to return the key stem 102 to its central normal position whenever it is released by the latching mechanism.

It is desirable to register the character of the machine operation by printing a signal indicating the type of operation beside the amount, except in the case of an adding operation, where no such signal is necessary. The means disclosed herein for accomplishing this signal printing is best shown in Figs. 13 to 17, and comprises a sector 260 having a type segment 262 secured thereto bearing the letters "T" for total, "N" for non-add, "—" for subtracted items, and an "S" for subtotal. The positions of these type are indicated by the legends in Fig. 13.

The sector 260 has an inverted T-shaped slot 264, best shown in Fig. 15. A pin 266 projects sidewardly from the lower end of the key stem 102 into the slot 264, and also may engage in an open end slot 268 formed in a slide 270. This slide is guided for radial movement on the sector 260 by a pin 272, which extends through an elongated slot 274, and by an elongated slot 276 which embraces the hub 277 of the sector 260. The sector is normally urged to move in a clockwise direction by a tension spring 278. The lower end of the slide 270 is provided with an arcuate slot 280 for the reception of a pin 282 carried at the rearward end of a lever 284.

When the slide 270 is in the position in which it is shown in Fig. 13, the pin 266 is held in the center portion of the slot 264 and thus if the key is swung forwardly, as for taking a total, the sector 260 will be rocked counterclockwise with the key to bring the "T" type into printing position. Similarly, if the key 26 is swung rearwardly to take a subtotal, the subtotal type will be brought into printing position, it being noted that the key stem 102 is pivoted on stud 104 so that as the key is swung in one direction the sector 260 will be rotated in the opposite direction.

A lever 287, pivoted on a stud 288, has its upper end 290 normally held against a stud 292 on the minus key stem 47 by a tension spring 294. When the minus key is depressed (Fig. 16) the spring 294 pulls the lever 286 clockwise, bringing the upper end of the lever 286 over the stud 292, and thus holds the minus key 24 in its depressed position. The motor is energized when the minus key is thus depressed, and the rock shaft 214 commences rotating counterclockwise. A plate cam 296 fixed on this shaft engages a roller 298 carried at the end of an arm 300, and swings the arm in a clockwise direction. When the subtract key is depressed and the lever 286 swings clockwise, a pin 302 on the latter engages the upper ear of a hook member 304 and swings the latter to the position in which it is shown in Fig. 16. The hook member 304 is pivoted at the end of a bellcrank 306 which in turn is pivoted on a stud 308. The hook member 304 is biased to move toward the position in which it is shown in Fig. 13, by a tension spring 310. The arm 306 is rigidly connected with an arm 312. Thus when the roller 298 is forced out of the notch in the cam plate 296, as the machine commences operating, the arm 300 will be swung downwardly, carrying the hook member 304 and the arms 306 and 312 clockwise with it. A motion reversing lever 314 is pivoted on a stud 316, and has a pin and open end slot pivotal connection with the arm 312. The lever 314 has a stud 318 at its rearward end for engagement with a forwardly projecting ear 320, which is part of a lever 321 pivoted on a shaft 286.

The rearwardly extending portion of the lever 321 has two prongs 322 and 323. As the lever 321 is swung clockwise, the prong 323 engages the pin 282 and moves the slide 270 downwardly, thus freeing the sector for pivotal movement to the extent allowed by the horizontal portion of the inverted T-shaped slot 264. Thus the spring 278 would be free to swing the sector 260 clockwise, were it not for the fact that the other prong 322 of the lever 321 engages a stud 324 on the sector and forces the sector counterclockwise against the tension of spring 278 to bring the minus sign type in printing position.

After the calculating and printing operation has been completed, and as the main rock shaft approaches its normal position, a stud 326 on the plate cam 296 engages a wipe pawl 328 and swings the lever 287 counterclockwise, thereby releasing the minus key, which is returned to its normal position by its return spring 330, and permitting the restoration to normal position of all parts just described with reference to Fig. 13.

Figure 17:
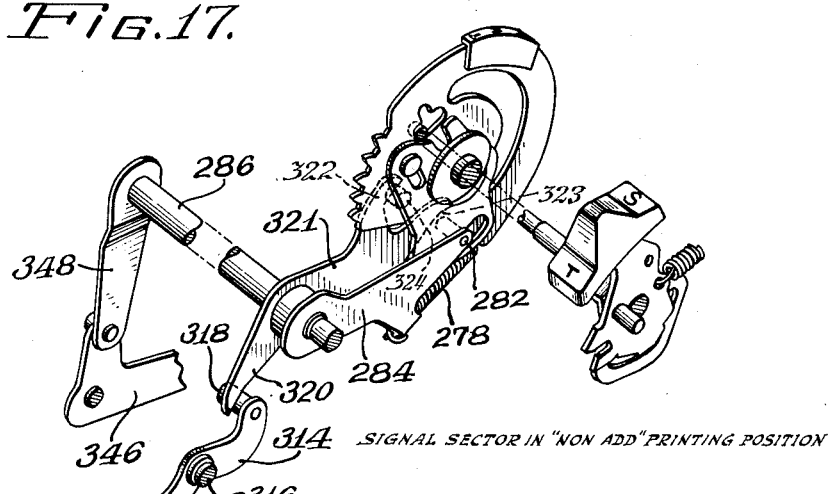
Fig. 17 is a perspective view of a portion of the mechanism used to position the signal printing segment upon operation of the non-add key lever.

Referring to Fig. 14, when the non-add key 28 is swung rearwardly for a non-add operation, its key stem 126 pivots on a stud 128 and carries a pin 332 which engages the upper end of a lever 334 pivoted on a stud 336. The lower end of the lever 334 carries a pin 338 which operates in an open end slot 340 formed in a bail-shaped lever 342, 343, pivoted on a stud 344. The lever 342, 343 is thus swung counterclockwise and, through a pin and slot connection with the rearwardly extending arm 346 of a suitably pivoted bellcrank, swings the latter clockwise. The upwardly extending arm 347 of bellcrank 346, has a pin and slot connection with an arm 348 fixed to the shaft 286, which, as best shown in Fig. 17, extends across the machine, and near its right-hand end carries the lever 284. As viewed in Fig. 14, the movement of the shaft 286 was in a counterclockwise direction, so that as viewed in Fig. 17, the rotation of the shaft 286 is in a clockwise direction, and thus through the pin 282 and cooperating slot 280 of the slide 270, the latter is moved downwardly, freeing the sector 260 for clockwise rotation by its spring 278 to the extent permitted by the pin 266 and inverted T-shaped slot 264. This clockwise movement of the sector 260 will bring the non-add signal type "N" in printing position. The means for holding the non-add key 20 in operated position during the machine cycle, is not disclosed herein, but may be of the type shown in the patent to T. O. Mehan No. 2,411,050.

From the foregoing, it will appear that whenever one of the keys 22, 24, 26, or 28 is operated, the operation of the other keys of this group is prevented by means of the locking arm 78, the slide 82, or the arm 92, and that these keys are thus completely interlocked. Further, the operation of the subtotal and total key 26 in either direction, the operation of the minus key bar 24, or the operation of the non-add key, will index the type segment 262 to the proper position for imprinting the correct signal character.

Due to the provision of the latching mechanism for the total and subtotal key 26, as particularly shown in Figs. 9 to 12, rapid operation of the machine is made possible without undesired blank strokes, and further, this latching mechanism is disabled whenever the hood 176 is raised, due to the provision of the slide 242. Likewise, the raising of the hood disables the driving motor by opening its energizing circuit.

While we have shown and described a preferred embodiment of our invention, it will be apparent that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. In a calculating machine, an add key, a subtract key, a combined total and subtotal key pivoted for movement in either direction from its normal position, a nonadd key, a stem for each of said keys, a pivoted locking arm adjacent the add and subtract keys and cooperable with means on their stems to prevent depression of these keys when the locking arm is in one position, a slide cooperable with said locking arm to move it to locking position, means operable by the total and subtotal key when moved in either direction from its normal position to move said slide and locking arm to key locking position, and means operable by the non-add key to move said slide and locking arm to locking position.

2. In a calculating machine having a key tiltable from normal position in one direction to initiate a total taking operation and in the opposite direction to initiate a subtotal taking operation, said key having a stem provided with a pair of projections, a spring operated latch engageable with either of said projections to hold the key in either position to which it may be tilted, a keeper for said latch, means operable from the main shaft of the machine to lock said key in tilted position shortly after the commencement of an operating cycle and thereafter maintain said latch from engagement with the key stem by means of said keeper, means operated near the end of the operating cycle to disengage the keeper from the latch, means to disable said key stem latching means, and a hood forming part of the machine casing for operating said disabling means.

3. In a calculating machine having an add key, a subtract key, a combined total and subtotal key, a nonadd key, and a stem for each of said keys, means whereby operation of the add key will prevent the operation of the remaining keys, said means comprising a pivoted locking arm, means on the add key stem to move the locking arm away from the add key upon operation thereof, and means on the subtract key stem for engagement with the locking arm to lock the subtract key upon movement of the locking arm away from the add key; a shaft, a lever secured to said shaft, means carried by the nonadd key stem engaging with means secured to the shaft for rotating the shaft and lever in one direction upon movement of the nonadd key from its normal central position, a slide positioned for engaging with the locking arm and movable away from the add key upon movement therefrom of the locking arm, means on the slide engageable with means on the lever to prevent rotation of the lever and shaft and thereby to lock the nonadd key upon movement of the locking arm and slide away from the add key when said add key is operated; a sleeve rotatably mounted on said shaft and coaxial therewith, means carried by the total and subtotal key stem and engaging with means secured to the sleeve for rotating said sleeve upon movement of the total and subtotal key away from its normal central position, a crank pivoted for movement upon rotation of the sleeve, a pivoted lever provided with a notch for engagement with a pin carried by the crank, and means carried by said pivoted lever for engagement with the slide, so that operation of the add key, by moving the locking arm and slide away from said add key, causes the notch in the pivoted lever to engage the pin carried by the crank and thereby to lock the total and subtotal key.

4. In a calculating machine having an add key, a subtract key, a combined total and subtotal key, a nonadd key, and a stem for each of said keys, means whereby operation of the subtract key will prevent the operation of the remaining keys, said means comprising a pivoted locking arm, and means on the subtract key stem for engagement with means on the locking arm to move the locking arm into engagement with means on the add key stem and thereby to lock the add key upon operation of the subtract key; a shaft, a lever secured to said shaft, means carried by the nonadd key stem engaging with means secured to the shaft for rotating the shaft and lever in one direction upon movement of the nonadd key from its normal central position, a slide, means on the subtract key stem for engagement with the slide to move the slide into engagement with means carried by the lever when the subtract key is operated, thereby to prevent rotation of the lever and the shaft and to lock the nonadd key; a sleeve rotatably mounted on said shaft and coaxial therewith, means carried by the total and subtotal key stem and engaging with means secured to the sleeve for rotating said sleeve upon movement of the total and subtotal key away from its normal central position, a crank pivoted for movement upon rotation of the sleeve, a pivoted lever provided with a notch for engagement with a pin carried by the crank, and means carried by said pivoted lever for engagement with the slide, so that when operation of the subtract key moves the slide to effect locking of the nonadd key said operation also moves the slide into engagement with said pivoted lever, thereby causing said notch therein to engage the pin carried by the crank and to lock the total and subtotal key.

5. In a calculating machine having an add key, a subtract key, a combined total and subtotal key, a nonadd key, and a stem for each of said keys, means whereby operation of the nonadd key will prevent the operation of the remaining keys, said means comprising a shaft, a lever secured to said shaft, means carried by the nonadd key stem engaging with means secured to the shaft for rotating the shaft and lever in one direction upon movement of the nonadd key from its normal central position, a pivoted locking arm adjacent the add and subtract keys, a slide, means on the lever for moving the slide into engagement with the locking arm upon operation of the nonadd key, and means on the stems of the add and subtract keys for engagement respectively with the locking arm and slide to lock the add and subtract keys when the slide is caused to engage with the locking arm upon operation of the nonadd key; a sleeve rotatably mounted on said shaft and coaxial therewith, means carried by the total and subtotal key stem and engaging with means secured to the sleeve for rotating said sleeve upon movement of the total and subtotal key away from its normal central position, a crank pivoted for movement upon rotation of the sleeve, a pivoted lever provided with a notch for engagement with a pin carried by the crank, and means on the first mentioned lever for engagement with the pivoted lever upon operation of the nonadd key whereby to cause said notch to engage the pin carried by said crank and to lock the total and subtotal key.

6. In a calculating machine having an add key, a subtract key, a combined total and subtotal key, a nonadd key, and a stem for each of said keys, means whereby operation of the total and subtotal key will prevent the operation of the remaining keys, said means comprising a shaft, a sleeve rotatably mounted on said shaft and coaxial therewith, means carried by the total and subtotal key stem and engaging with means secured to the sleeve for rotating said sleeve upon movement of the total and subtotal key away from its normal central position, a crank pivoted for movement upon rotation of the sleeve, a pivoted lever adjacent said crank, a pivoted locking arm adjacent the add and subtract keys, a slide positioned between the crank and the locking arm, means on the crank to move the pivoted lever upon operation of the total and subtotal key, means on the pivoted lever to cause movement of the slide into engagement with the locking arm when the pivoted lever is moved by the crank upon operation of the total and subtotal key as aforesaid, and means on the stems of the add and subtract keys for engagement respectively with the locking arm and slide to lock the add and subtract keys upon movement of the slide into engagement with the locking arm.

7. In a calculating machine having a combined total and subtotal key, a stem for said key, a plurality of teeth forming part of said key stem, and means for returning said key to its normal central position after movement of the key therefrom, a pivoted latch engageable with one of the teeth on said key stem so as to prevent return of said key to its central position upon an incompleted movement of the key toward its operating position, and means operable during the initial portion of a machine cycle to move the key to completely operated position whenever it has been incompletely operated.

8. In a calculating machine having a combined total and subtotal key, a stem for said key, a plurality of teeth forming part of said key stem, and means for returning said key to its normal central position after movement of the key therefrom, a pivoted latch engageable with one of the teeth on said key stem so as to prevent return of said key to its central position upon an incompleted movement of the key toward its operating position, and means operated shortly after commencement of an operating cycle of the machine to complete the movement of the key to its operating position if such movement has been incomplete, and to lock the key in its operating position.

9. In a calculating machine having a casing, a paper roll and inking ribbon enclosed therein, a combined total and subtotal key, said casing including a hood with an opening therein for said key, said hood being movable over the paper roll, the inking ribbon, and said key when the key is in its normal central position, and means for returning said key to its central position after movement of the key therefrom, means to prevent return of said key to its central position upon an incompleted movement of the key toward its operating position when the hood is in normal closed position, said second mentioned means comprising a plurality of teeth forming part of said key stem, a pivoted latch, and means on the latch to engage one of said teeth so as to prevent return movement of the key when the key is moved toward operating position; and means for preventing operation of said second mentioned means upon movement of said key away from its normal central position while the hood is in raised position over the paper roll and the inking ribbon, comprising a slide positioned for limited reciprocation in a generally vertical direction, said slide being pressed downwardly by engagement thereof with the under surface of the hood when the hood is in its normal, closed position, means for causing upward movement of the slide upon movement of the hood from its closed position, and means secured to the slide for engaging with the latch upon said upward movement of the slide, so as to keep said latch out of engagement with any of the teeth on said key stem.

References Cited in the file of this patent

UNITED STATES PATENTS

| | | |
|---|---|---|
| 1,455,280 | Vickers | May 15, 1923 |
| 1,767,673 | Horton et al. | June 24, 1930 |
| 1,822,031 | Hoffmeister | Sept. 8, 1931 |
| 1,877,802 | Britten, Jr. | Sept. 20, 1932 |
| 2,021,327 | Phinney | Nov. 19, 1935 |
| 2,121,683 | Britten, Jr. | June 21, 1938 |
| 2,251,097 | Anderson | July 29, 1941 |
| 2,280,920 | Landsiedel | Apr. 28, 1942 |
| 2,362,709 | Mehan | Nov. 14, 1944 |
| 2,404,170 | Gubelmann | July 16, 1946 |
| 2,528,647 | Garbell | Nov. 7, 1950 |
| 2,570,068 | Niemann | Oct. 2, 1951 |